UNITED STATES PATENT OFFICE.

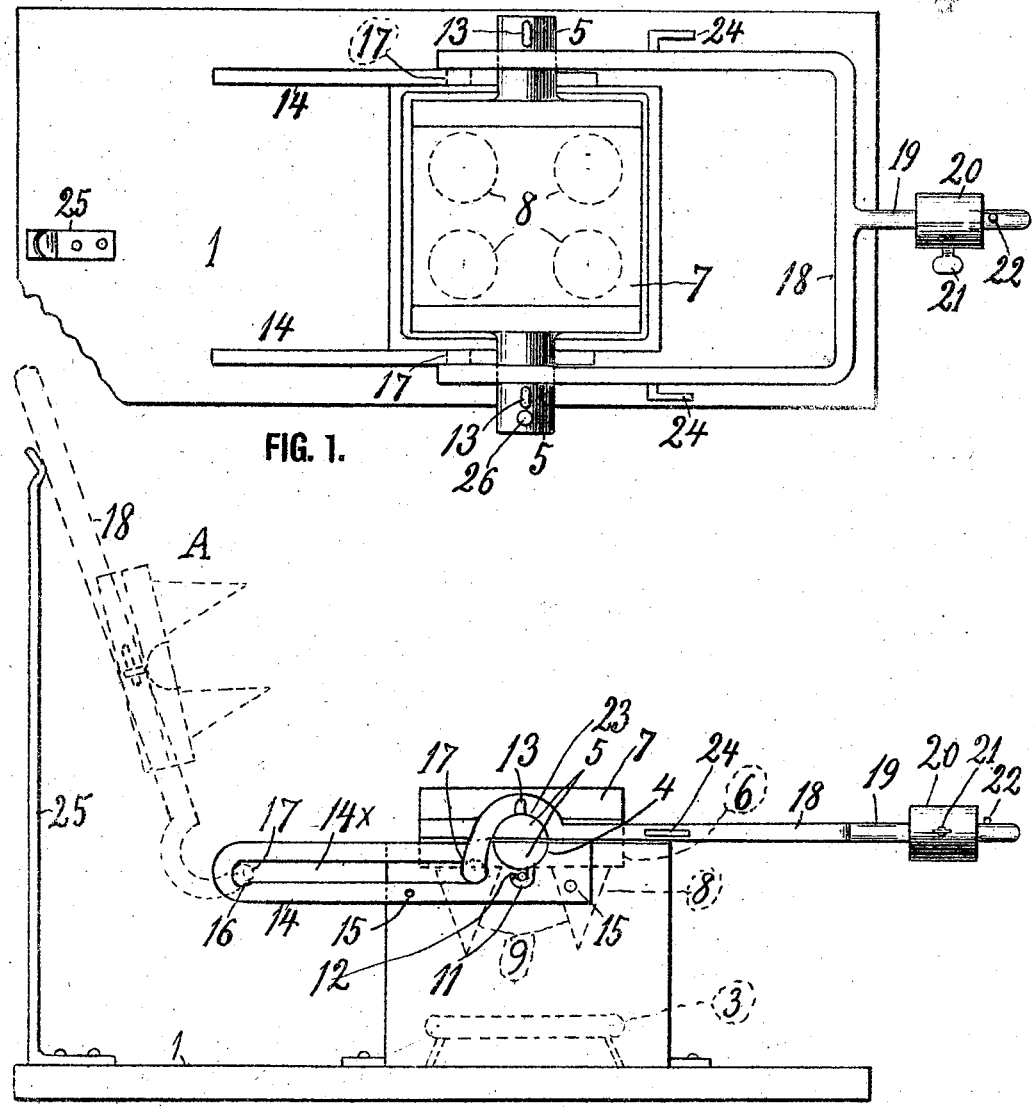

PETER CORNIE FLAGSTAD AND OSCAR A. FLAGSTAD, OF ST. PAUL, MINNESOTA.

MACHINE FOR MAKING PASTRY CONES.

1,019,238.  Specification of Letters Patent.  Patented Mar. 5, 1912.

Application filed March 11, 1910. Serial No. 548,612

*To all whom it may concern:*

Be it known that we, PETER CORNIE FLAGSTAD and OSCAR A. FLAGSTAD, citizens of the United States, residing at St. Paul, in the county of Ramsey and State of Minnesota, have invented a new and useful Machine for Making Pastry Cones, of which the following is a specification.

Our invention relates to devices for molding and baking hollow pastry cones; and the object is to provide a machine of said kind with certain improvements, which will fully appear from the herein below description and claims; reference being had to the accompanying drawing, in which,—

Figure 1 is a top or plan view of the improved device. Fig. 2 is a side elevation of the device, and Fig. 3 is an edge view of the plates holding the cores and molds between which the pastry cones are formed and baked, and a portion of the stove casing supporting the plates shown in section.

Referring to the drawing by reference numerals, 1 designates a bench upon which is mounted a gas stove, or oven casing 2, having in its base a burner 3 and in its upper edge, oppositely disposed open bearings 4, in which rotate the divided or split journals 5 of a pair of plates 6, 7, of which plate 6 is provided with conic molds 8 and plate 7 with conic cores 9 adapted to fit in the molds with spaces 10 between each core and its mold for the pastry to be molded and baked in. The journals of the mold plate 6 are each provided with a hook 11 adapted to catch under a stud 12 fixed in the side of the stove casing to hold the plate down when the core plate 7 is pulled upward therefrom after the plates are stuck together by the baked pastry. The journals of the core plate are each provided with a staple 13, or other suitable catch.

Rearward from the oven casing extend two horizontal parallel slotted arms 14, which in the present instance are shown as secured at 15 to the sides of the oven casing but they may also be cast integral with the oven casing as extensions of the upper side edges of same. Near the rear end of each slot 14$^x$ is provided a notch 16. In said slots 14$^x$ slide two inward projections or studs 17 of the branches of a bifurcated lever 18, which is formed with a handle 19 provided with a slidable weight 20 having a thumbscrew 21 by which the weight may be secured at the desired place on the handle; a stud 22 prevents separation of the weight from the handle. Near the fulcrum studs 17, the lever is formed with notches 23 adapted to fit and press upon the split journals so as to squeeze the plates firmly together when the lever is in horizontal forward position and either made heavy enough to act as a weight or provided with the weight 20. The branches of the lever are provided with fingers 24. Rearward of the stove casing is secured on the bench a supporting post 25.

In the operation of the machine, when the gas stove is lighted and the mold and core plates heated by the gas flame, the operator slides the lever rearward and then forward to make the fingers 24 engage in the staples 13; he then raises the lever and core plate high enough to admit the paste into the molds, whereupon he lowers the core plate upon the mold plate, and in order to get the required pressure on the journals of the plates he unhooks the lever from the staples 13 and pulls it forward as far as the slots 14$^x$ will permit, which brings the notches 23 over the journals, the weight of the lever will on small or few cone molds, give the required pressure, but where a large number of molds and cores are carried by each plate more pressure is required to resist the action of the steam formed in the dough or paste, and in such cases the weight 20 is provided and is of the required size. If the operator is a fairly strong person, he moves the weight to the place on the lever where it will give the desired pressure and secures the weight there; but if the operator is not strong enough to care to raise the lever with the weight near the pin 22, he leaves the weight loose and moves it inward on the lever each time he is going to raise the lever, and moves it back again toward the pin 22 as soon as the lever is lowered to its forward position. When the cones are partly baked, the handle 26, with which one of the journals is provided, is taken hold of and the two plates are turned with the points of the cone molds upward and left in that position until the cones are baked, the plates are then turned with cone points down, the lever is pushed rearward and then pulled slightly forward to get the fingers 24 into the staples 13, whereupon the lever is raised up against the support 25 as shown in dotted lines A in Fig. 2, the pastry cones are removed from the cores, new paste filled in the molds, the core plate and lever lowered again upon the mold plate, the lever is unhooked from the staples 13 and pulled forward to squeezing position, and the operation repeated. It will be noted that while the lever is raised, its studs 17 rest in the notches 16 to prevent forward sliding of the studs in the slots.

What we claim is:—

1. In a device of the kind described, a stove having an open top with open bearings in the edges thereof, a pair of arms extending rearwardly from the stove and provided each with a longitudinal slot, two plates provided with meeting half journals adapted to rest in the bearings, conic molds on one of the plates and cores on the other plate to enter the molds with small spaces between them for the pastry, a bifurcated gravity-actuated lever having the ends of its branches provided with studs slidable in the slots of the arms, and near said studs curved portions adapted to engage the upper sides of the journals to press the plates together when the lever is in a substantially horizontal forward position, means for engaging said lever with the core-carrying plate to lift it and means on the stove and on the mold-carrying plate adapted to engage one another by a rotary movement of the plate in its bearings, and to retain said plate when the upper plate is raised by the lever.

2. In a machine of the kind described, a plate with conic molds, a plate with conic cores adapted to enter the molds, a lever arranged to press the plates closely together and a weight on the lever to increase the pressure.

3. In a machine of the kind described, a plate with conic molds, a plate with conic cores adapted to enter the molds, a lever arranged to press the plates closely together and a weight on the lever to increase the pressure; said weight being slidable on the lever, and the lever having means to prevent separation of the weight from it.

4. In a machine of the kind described, a plate with conic molds, a plate with conic cores adapted to enter the molds, a lever arranged to press the plates closely together and a weight on the lever to increase the pressure; said weight having a set screw by which it may be secured at the desired place on the lever.

In testimony whereof we affix our signatures, in presence of two witnesses.

P. CORNIE FLAGSTAD.
OSCAR A. FLAGSTAD.

Witnesses:
M. M. CARLSEN,
A. E. CARLSEN.